Dec. 7, 1965   D. B. MARLEY   3,221,708
SPRAYING APPARATUS FOR WASHING CATTLE
Filed Jan. 13, 1964

DANIEL B. MARLEY
INVENTOR

Huebner & Worrel
ATTORNEYS

United States Patent Office 3,221,708
Patented Dec. 7, 1965

3,221,708
SPRAYING APPARATUS FOR WASHING CATTLE
Daniel B. Marley, 3125 N. Milburn, Fresno, Calif.
Filed Jan. 13, 1964, Ser. No. 337,262
3 Claims. (Cl. 119—158)

The present invention relates to an apparatus for washing cattle and the like and more particularly to a washing device utilizing a sprinkler adapted to impinge a fluid stream on such cattle and having facility to shield the device against damage from the cattle and to protect the cattle from the device.

Sanitary standards required of the dairy industry have risen steadily as a result of increased knowledge acquired in the related fields of the bacteriological and medical sciences. As a result, more and more emphasis is placed upon the cleanliness of dairies. Modernly it is regarded as good sanitary practice to wash milk cows before they are admitted to their milking barns. It has been discovered that such washing can be effectively accomplished by subjecting such cows to forceful spray directed upwardly against them from positions adjacent to the ground. It has also been found advantageous to have the cows mill about to some extent while subjected to the spray to insure maximum coverage and to enhance the desired flushing or rinsing effect.

While ostensibly the requirements of such a system appear readily achievable, in actual practice they present major difficulties which, prior to the present invention, made their attainment impractical in commercial installations. In order properly to clean the dairy cows and to keep them clean until admitted to their milking barn, a hard-surfaced drainage floor is required. It is impractical to recess sources of spray into the floor because of interference with effective drainage, complications in spray adjustment and operation, difficulties of repair, and installation expense. It thus has been determined that surface installation is preferable. However, when sources of spray are provided on a drainage floor, they are disposed in the way of the cows and, prior to the present invention, resulted in injury to the cows, particularly their hooves, and frequent damage and maladjustment to the sources of spray. Further, when conduits are laid directly on such floors to supply water for the sprays, the conduits interfere with proper drainage.

Therefore, it is an object of the present invention to provide an improved apparatus for washing cattle and the like.

Another object is to provide such a cattle washing device which is impervious to damage from hoof blows and the like.

Another object is to provide such a washing device which is non-injurious to cattle.

Another object is to provide such a washing device having ground-support means for itself and a fluid supply conduit therefor.

Another object is to provide such a device allowing substantially free drainage of spent fluid and waste.

Another object is to provide an improved sprinkling apparatus for washing cattle adapted to discharge fluid forcefully in a well-distributed pattern in close proximity to the cattle.

A further object is to provide improved elements and arrangements thereof in a device of the character and for the purposes set forth.

Still further objects and advantages will become apparent in the subsequent description in the specification.

Referring more particularly to the drawings, the sprinkling apparatus is shown generally at 10 and consists of a grid-shaped fluid-supply conduit or header 11 connecting a quantity of sprinkler devices 12 preferably arranged in the staggered pattern shown. The discharge trajectories of the sprinkler devices are such that they have overlapping discharge patterns 13.

Figure 1:
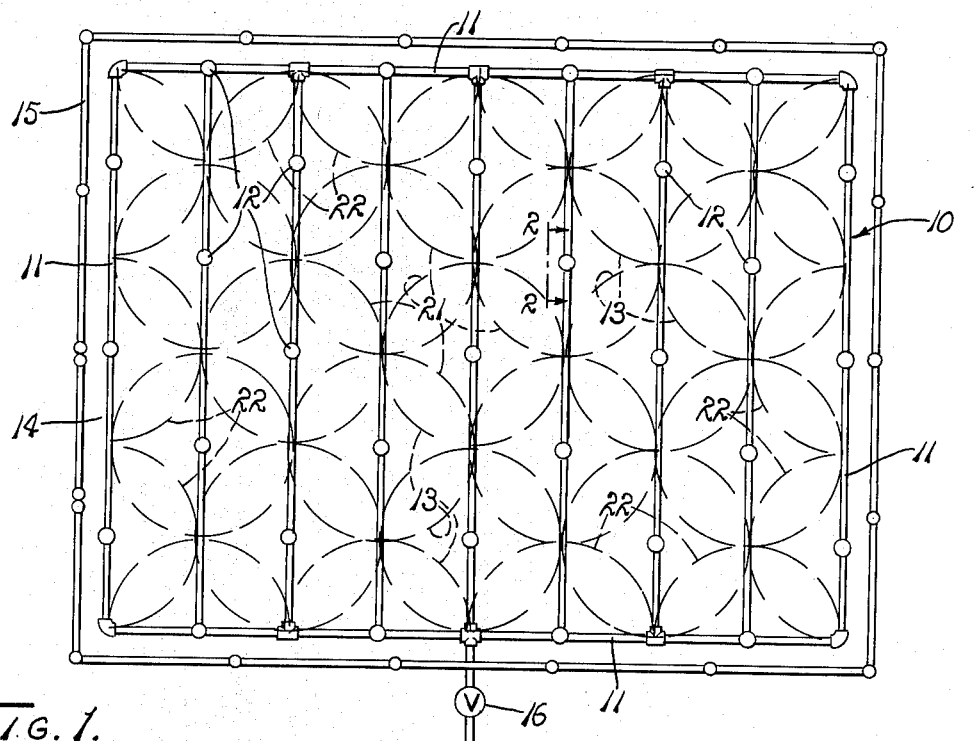
FIG. 1 is a plan view of the washing apparatus of the present invention.

The fluid-supply conduit 11 with the sprinkler devices is supported on a hard-surfaced drainage floor 14 of a cattle corral 15 so that a diagrammatic plot of the overall fluid-discharge pattern covers the entire interior area of the corral, as shown in FIG. 1. A central fluid-supply valve 16 conveniently controls the sprinkling throughout the entire corral.

Figure 2:
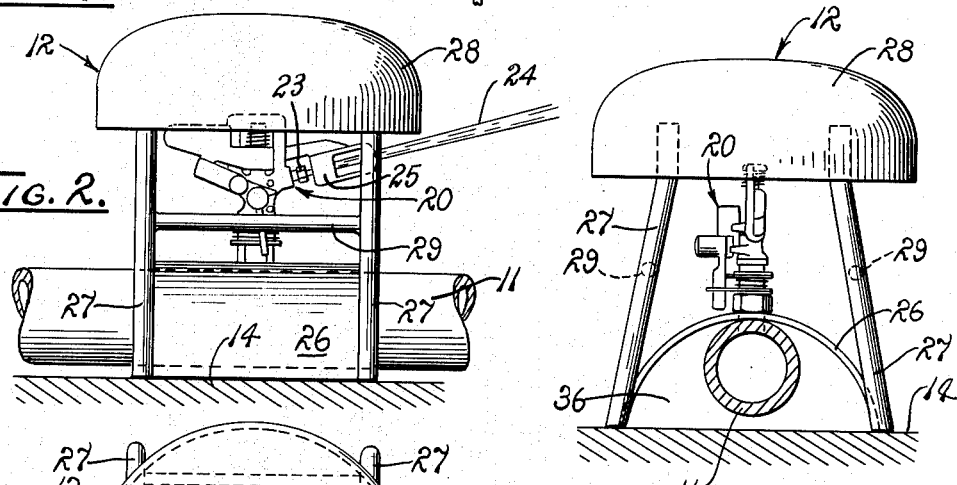
FIG. 2 is a side elevation of a sprinkler device of the present invention as viewed along line 2—2 of FIG. 1.
Figure 3:
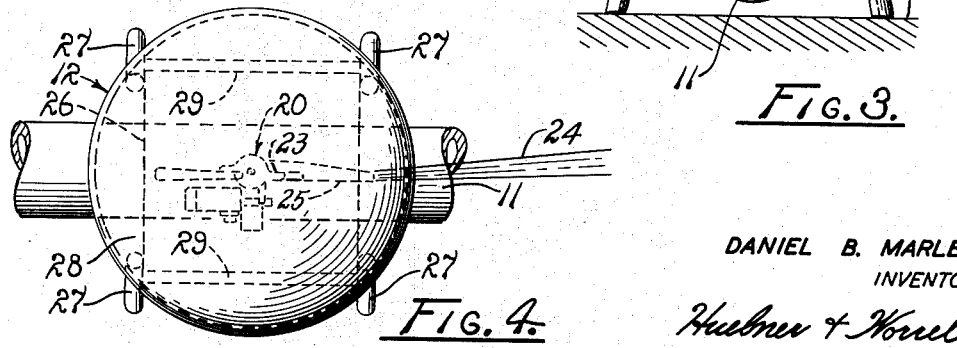
FIG. 3 is an end elevation of the sprinkling device.
Figure 4:
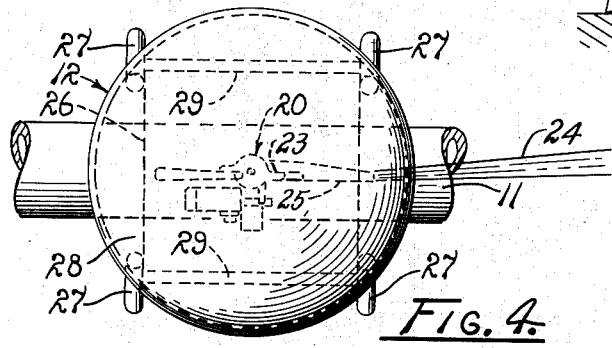
FIG. 4 is a top plan view of the sprinkler device of FIGS. 2 and 3.

A sprinkler unit or device 12 is shown in detail in FIGS. 2, 3 and 4 and consists of a rotary fluid sprinkler 20 capable of discharging fluid either throughout a complete 360° rotation, as at 21 in FIG. 1, or over only a predetermined arcuate segment, as at 22 in FIG. 1. Such sprinklers are well-known and are conveniently typified by that shown in United States Patent No. 2,928,608. As best shown in FIGS. 2 and 4, such well-known sprinklers provide a nozzle 23 which discharges a jet of water 24 in an upwardly directed trajectory substantially radially outwardly from its axis of rotation. The sprinkler is rotated or oscillated by a reaction arm or lever 25 which is pivotally mounted on the sprinkler for reciprocating movement into the jet of water 24 alternately temporarily interrupting the jet. During such interruption of the jet of water 24 emanating from the nozzle, the reaction element deflects the jet at a point outwardly spaced from the nozzle and eccentrically from the axis of rotation of the sprinkler to provide an auxiliary splash pattern, not shown, angularly related to the jet of water 24. The sprinkler is mounted on the header 11 through a semi-cylindrical guard or header support 26 of a diameter substantially greater than that of the header 11 and which is positioned downwardly over the header. The guard is affixed to the header, as by welding, and extends downwardly on opposite sides thereof so as to support the header in upwardly spaced relation to the floor 14. It will be noted that the guard presents a smooth concave upper surface from which cattle hooves can slide without damage.

A pair of legs 27 are rigidly mounted on the guard 26 on each side of the header 11 and upwardly extended therefrom. A dome-shaped cover 28 of rigid material, such as steel or the like, is mounted on the upper ends of the legs concentrically above the sprinkler 20. The cover has a circumscribing apron which terminates in a lower edge disposed above the discharge trajectory of the sprinkler.

To exclude the hooves of cattle from entrance between the cover 28 and the header 11, a brace 29 rigidly interconnects the legs of each pair in substantially parallel relation to the header. The braces are disposed below the discharge trajectory of the sprinkler to accommodate fluid discharge between the cover and braces without obstruction by either.

OPERATION

The operation of the described embodiment of the present invention is believed to be clearly apparent and is briefly summarized at this point. The cattle to be washed are herded into the corral 15 allowing sufficient space for them to mill safely about. The supply valve 16 is then opened so as to supply water under pressure to the sprinklers 20. Depending upon its location in the corral, each sprinkler then discharges a rotating or an oscillating jet of water 24 in having an upwardly directed trajectory, as best shown in FIG. 2, overlapping with the streams from neighboring sprinklers. During such rotation or oscillation, it is recognized that the jet of water 24 emanating from the nozzle 23 will be briefly interrupted during movement passed each of the legs 27 which ordinarily would cause the area outwardly from the legs to be missed by the jet. However, with the use of the sprinklers 20 in the present combination the auxiliary splash pattern provided thereby is effective to direct a stream of water into such area passed the legs by emanating from a point eccentrically of the axis of rotation of the sprinkler and its angular relation to the jet 24.

During the discharge of the oscillating and rotating streams, the cattle mill around in the corral, stimulated by the moving streams impinging against them. Such milling serves to provide maximum exposure to the upwardly directed streams and facilitates the cleaning action. In this regard oscillating and rotating sprinklers are found to be far superior to fixed sprinklers. They direct the streams of water in forcible streams of greater cleansing effect and induce the desired milling action.

As the cattle mill around, the individual sprinkler units 12 are subjected to random blows by various portions of the cattle, especially their hooves. However, the protective shielding afforded the sprinklers 20 by the bell-shaped cover 28, the rigid legs 27 and cross braces 29, all interconnected and mounted rigidly on the supply header 11, serve to prevent damage to the sprinklers. Furthermore, the surfaces and edges of the entire sprinkler unit 12 are such that possible injury to the cattle is minimized. For example, the unit displays no crevice or opening capable of catching a hoof or splitting the same.

As a result of the appreciable volume of fluid discharged during the washing process there must be effective means for draining off the dirty waste fluid. The hard-surfaced floor 14 is adapted to accommodate the run-off without allowing unsanitary deposit of sludge. It is a further feature of the present invention that the fluid-supply header 11 is supported sufficiently above the floor to allow free passage of waste thereunder without, at the same time, obstructing the movement of cattle. This support function is provided by the header guards 26 integral with each sprinkler unit, which provide floor-level passageways 36 to allow maximum drainage.

In view of the foregoing, it is readily apparent that the structure of the present invention provides an improved sprinkling apparatus for washing dairy cattle and the like capable of directing simultaneous sprays of cleansing fluid forcefully against all sides of the cattle, particularly the under sides for which cleansing is most desired. Furthermore, it is apparent that the individual sprinkler units of this structure are impervious to damage from hoof blows and the like as well as being non-injurious to the cattle. Included with the sprinkler units are supports for the fluid-supply header allowing free fluid drainage beneath the header throughout the washing process.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for washing cattle and the like comprising a substantially horizontal fluid conduit of predetermined diameter; a semi-cylindrical guard of a diameter appreciably greater than the conduit positioned downwardly thereover, the conduit being rigidly supported on the guard with the guard providing a curved upper surface to deflect the hooves of cattle away from the conduit; a rotary sprinkler connected to the conduit through the guard and having a predetermined radially outwardly directed upwardly inclined fluid discharge trajectory; a pair of legs rigidly secured to the guard on each side of the conduit and upwardly extended therefrom; a substantially circular dome-shaped cover rigidly mounted on the legs concentrically above the sprinkler having a depending apron providing a lower edge disposed above the discharge trajectory of the sprinkler; and a brace interconnecting each pair of legs in substantially parallel relation to the conduit to preclude the insertion of hooves of the cattle between the cover and the guard and being disposed below the discharge trajectory of the sprinkler.

2. An apparatus for washing cattle and the like comprising a corral for the cattle having a hard-surfaced drainage floor; a plurality of rotary sprinklers disposed adjacent to the floor of the corral, the sprinklers having overlapping predetermined discharge patterns substantially covering the floor; a conduit connected to the sprinklers adapted to supply water under pressure thereto; substantially semi-cylindrical guards positioned downwardly on the conduit rigidly supported thereon in elevated position above the floor providing unrestricted areas between successive guards along the conduit to permit free flow of water along the surface of the floor transversely of the conduit between the sprinklers; legs rigidly extended upwardly from ecah guard; and a dome-shaped cover mounted on the legs of each guard in spaced shielding relation above its respective sprinkler, each of the sprinklers having a predetermined radially outwardly directed upwardly inclined discharge trajectory disposed beneath its respective cover, said cover and said guard defining therebetween an opening aligned with said discharge trajectory of the sprinkler.

3. The apparatus for washing cattle and the like of claim 2 wherein the sprinklers have predetermined axes of rotation, the discharge pattern from each of the sprinklers is directed substantially radially outwardly from its axis of rotation; and each sprinkler provides an auxiliary splash pattern emanating from a point eccentrically of its rotational axis in a direction angularly disposed from the radial discharge pattern of its respective sprinkler.

References Cited by the Examiner

UNITED STATES PATENTS

| 1,481,365 | 1/1924 | Hegel | 119—74 |
| 1,511,450 | 10/1924 | Findlay | 119—156 |
| 1,863,914 | 6/1932 | Tyler | 239—524 |
| 1,968,564 | 7/1934 | Luks | 119—14.04 |
| 2,498,946 | 2/1950 | Evans | 119—159 |
| 2,684,658 | 7/1954 | Richardson et al. | 119—159 |

FOREIGN PATENTS 230,073    5/1960    Australia.

SAMUEL KOREN, *Primary Examiner.*

ALDRICH F. MEDBERY, *Examiner.*